C. TAYLOR.
DINNER CARRYALL.
APPLICATION FILED APR. 2, 1917.
1,291,248.
Patented Jan. 14, 1919.
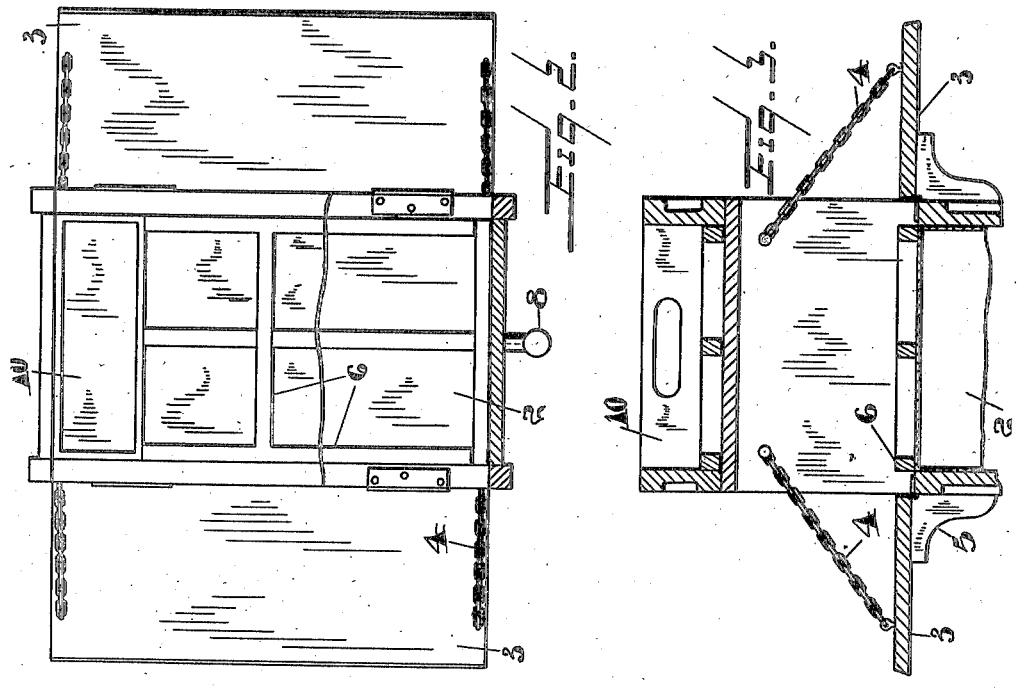
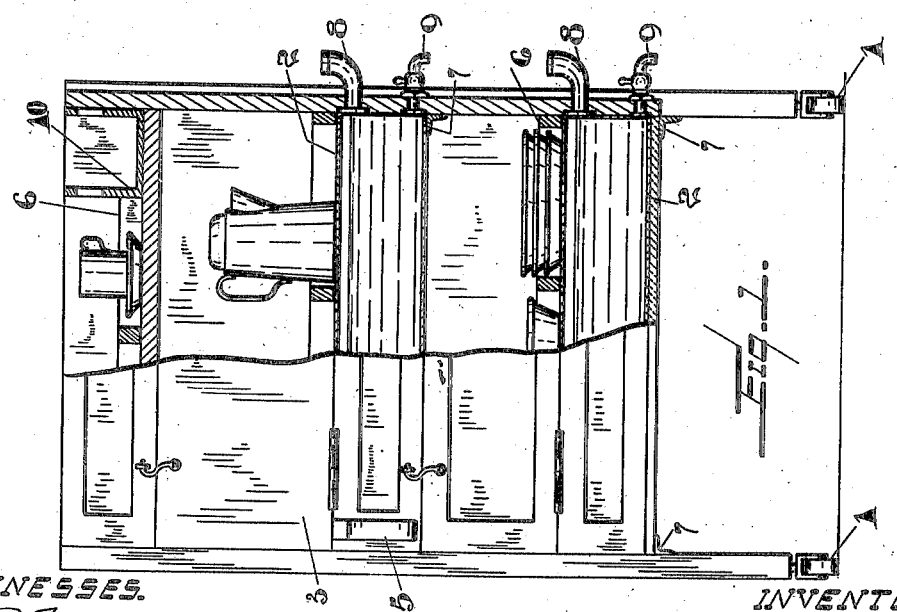
WITNESSES.
N. R. Tyndall.
L. M. Lewis
INVENTOR
C. Taylor.
BY J. Edward Maybee
ATTY.

UNITED STATES PATENT OFFICE.

CHARLES TAYLOR, OF TORONTO, ONTARIO, CANADA.

DINNER-CARRYALL.

1,291,248. Specification of Letters Patent. Patented Jan. 14, 1919.

Application filed April 2, 1917. Serial No. 159,309.

*To all whom it may concern:*

Be it known that I, CHARLES TAYLOR, of 277 Yonge street, in the city of Toronto, county of York, Province of Ontario, Canada, have invented certain new and useful Improvements in Dinner-Carryalls, of which the following is a specification.

My object is to devise means for conveniently serving hot meals direct from the kitchen at other places than the ordinary dining room or place for the serving of meals, and for keeping the food hot until eaten.

I attain my object by means of the constructions hereinafter described and as illustrated in the accompanying drawings in which—

Figure 1 is a side elevation, partly in section, of my device;

Fig. 2 a plan view, partly in section, of the same; and

Fig. 3 a side elevation of the upper part of the same.

In the drawings like numerals of reference indicate corresponding parts in the different figures.

The device comprises a suitable cabinet supported on caster wheels 1. Within the cabinet are supported at different levels one or more water tanks 2 provided with suitable filling spouts 8 and drainage cocks 9. The tanks are preferably removable, being supported on ledges 7 secured to the sides of the cabinet. The space around and above each tank is suitably inclosed and, if necessary, heat insulated to retain the heat of the hot water with which the tanks will be filled.

The space above each tank is provided with suitable doors or flaps 3, preferably hinged at their lower edges, so that they may be lowered and access obtained to the space within. Suitable latches will, of course, be provided for the doors. The upper doors 3 are preferably arranged so that they may be used as tables. Chains or hinged links 4 may be provided as shown to retain the doors in a horizontal position when open, or brackets such as 5 secured to the outside of the cabinet may be employed for this purpose.

The spaces may be provided with suitable racks 6 to prevent platters of food or other vessels from sliding around.

A space at the top of the cabinet is suitably divided or preferably is provided with removable trays 10 to contain various articles of tableware and napery. The lower spaces are used for the food which requires to be kept hot, the heat from the water in the tank being sufficient to retain the heat of the food for considerable periods of time. Foods to be eaten cold may be placed in the top of the cabinet.

The device will be filled in the kitchen and supplied with its necessary tableware and napery and wheeled to the room where it is to be used. With the upper doors 3 lowered, suitable table accommodation for two persons is at once provided and the food may be removed from the heated spaces or closets of the device as required. If the person or persons ordering the meal are not ready for it at the time of serving, the food may be retained in the device without cooling for considerable periods of time.

What I claim as my invention is:—

In a device of the class described, in combination a cabinet having a substantial unobstructed opening therethrough, a heating tank extending across said cabinet to form a heated table below said opening, and doors for the opposite sides of said opening, hinged at their lower edges contiguous to the upper opposite edges of said tank, said doors, when open, being approximately level one with another and with the surface of said tank, and said opening providing access from one door to the other of said doors, and from both doors to said tank, forming a practically continuous table heated in the center.

Signed at Toronto, Canada, this 26th day of March, 1917.

CHARLES TAYLOR.